(12) United States Patent
Tanno et al.

(10) Patent No.: US 7,315,566 B2
(45) Date of Patent: Jan. 1, 2008

(54) MOBILE COMMUNICATION SYSTEM, CHANNEL SYNCHRONIZATION ESTABLISHING METHOD, AND MOBILE STATION

(75) Inventors: Motohiro Tanno, Yokosuka (JP); Hiroyuki Atarashi, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 832 days.

(21) Appl. No.: 10/366,385

(22) Filed: Feb. 14, 2003

(65) Prior Publication Data

US 2003/0152178 A1  Aug. 14, 2003

(30) Foreign Application Priority Data

Feb. 14, 2002  (JP)  ............................. 2002-037247

(51) Int. Cl.
  *H04B 1/707*  (2006.01)
(52) U.S. Cl. ...................... 375/142; 375/145
(58) Field of Classification Search ................ 375/147, 375/366, 142, 145, 149, 150, 260, 367; 370/280, 370/342, 320, 335, 441; 455/434
See application file for complete search history.

(56) References Cited

U.S. PATENT DOCUMENTS

| 5,151,925 | A | 9/1992 | Gelin et al. |
| 5,627,863 | A | 5/1997 | Aslanis et al. |
| 5,930,366 | A | 7/1999 | Jamal et al. |
| 6,208,624 | B1 * | 3/2001 | Tanno et al. ............... 370/280 |
| 6,493,376 | B1 | 12/2002 | Harms et al. |
| 6,853,631 | B1 * | 2/2005 | Nakamura et al. ........... 370/342 |
| 6,961,565 | B2 * | 11/2005 | Tanno et al. ................. 455/434 |
| 2001/0021236 | A1 * | 9/2001 | Song ........................... 375/366 |
| 2002/0191682 | A1 * | 12/2002 | Moon ........................... 375/147 |

FOREIGN PATENT DOCUMENTS

| EP | 0 895 388 A2 | 2/1999 |
| EP | 1 059 818 A2 | 12/2000 |
| EP | 1 172 983 | 1/2002 |

(Continued)

OTHER PUBLICATIONS

Motohiro Tanno, et al., "Three-Step Fast Cell Search Algorithm Utilizing Common Pilot Channel for OFCDM Broadband Packet Wireless Access", VTC 2002-Fall. 2002 IEEE 56th, Vehicular Technology Conference Proceedings, XP-010608694, vol. 1 of 4. conf. 56 Sep. 24, 2002, pp. 1575-1579.

(Continued)

*Primary Examiner*—Don N. Vo
(74) *Attorney, Agent, or Firm*—Oblon, Spivak, McClelland, Maier & Neustadt, P.C.

(57) ABSTRACT

A mobile communication system 1 according to the present invention comprises base station 30 and mobile station 10. The base station 30 sends a pilot symbol sequence known to the mobile station 10, to the mobile station 10, using a plurality of carriers for downward channels, and performs communication with the mobile station 10 while multiplying the channels by frequencywise same scrambling codes every symbol period. The mobile station 10 is provided with a peak detector 17 for calculating cross correlation allowing for a phase difference of the scrambling codes, between frequencywise pilot symbol sequences received from the base station 30, thereby detecting a radio frame boundary.

24 Claims, 6 Drawing Sheets

FOREIGN PATENT DOCUMENTS

| | | |
|---|---|---|
| EP | 1 175 056 | 1/2002 |
| KR | 2001-0031050 | 4/2001 |
| WO | WO 99/19992 | 4/1999 |
| WO | WO 99/29078 | 6/1999 |
| WO | WO 01/35591 | 5/2001 |

OTHER PUBLICATIONS

Frederick J. Block, et al., "Parallel Acquisition of Multicarrier Direct-Sequence Spread-Spectrum Signals", Vehicular Technology Conference, 1999 IEEE, XP-010341918, vol. 1, May 16, 1999, pp. 97-102.

Sang Hyo Kim, et al., "A Frame Synchronization Scheme for Uplink MC-CDMA", Vehicular Technology Conference, VTC 1999-Fall, IEEE VTS 50th, XP-010352999, Sep. 19, 1999, pp. 2188-2192.

Seunghyeon Nahm, et al., "A Synchronization Scheme for Multi-Carrier CDMA Systems", Communications, 1998, ICC 98, Conference Record, 1998 IEEE International Conference, XP-010284579, vol. 3, Jun. 7, 1998, pp. 1330-1334.

T. Keller, et al., "Orthogonal Frequency Division Multiplex Synchronisation Techniques for Wireless Local Area Networks", IEEE International Symposium on Personal, Indoor and Mobile Radio Communications, XP-002063294, vol. 3, Oct. 15, 1996, pp. 963-967.

K. Fazel, et al., "On the Performance of Convolutionally-Coded CDMA/OFDM for Mobile Communications System", The fourth International Symposium on personal, indoor and mobile radio communications, Sep. 8-11, 1993, pp. 468-472.

http://www.arib.or.jp/IMT-2000/ARIB-STD/ITU/25213-311.pdf., pp. 1-27, "3G TS 25.213 V3.1.1 Spreading and Modulation (FDD)", 1999.

* cited by examiner

MOBILE COMMUNICATION SYSTEM, CHANNEL SYNCHRONIZATION ESTABLISHING METHOD, AND MOBILE STATION

BACKGROUND OF THE INVENTION

1. Field of the Invention

The present invention relates to a mobile communication system, a channel synchronization establishing method, and a mobile station.

2. Related Background Art

Recently, the mobile communication systems utilizing the code division systems such as the W-CDMA (Wideband-Code Division Multiple Access) system are in practical use, in order to increase the utilization efficiency of frequency bands for radio communications. In such mobile communication systems, a common frequency band is used in a plurality of cells and it is thus difficult to identify each cell where mobile equipment is located, by referring to the frequency band. In order to identify each cell, therefore, it is common practice to multiply downward channels (hereinafter referred to as "downlink channels") by scrambling codes (spreading codes) different among the cells.

In such mobile communication systems, the cell search operation described below has to be performed in order for a mobile station to communicate with a desired base station. Specifically, the mobile station first detects a radio frame boundary (hereinafter referred to simply as a "frame boundary") of the downlink channel of the base station to be connected. Then the mobile station detects the scrambling code used by the base station.

On the other hand, in the case of the orthogonal frequency and code division multiplex (OFCDM: Orthogonal Frequency and Code Division Multiplex) system being one of typical multiplex systems using a plurality of carriers for downlink channels, the cell search is performed by three-step processing, in order to implement a fast cell search. The three-step processing includes symbol boundary detection, frame boundary detection, and scrambling code detection. The frame boundary detection process of the second step also involves a simultaneously executed operation of separating the scrambling codes into several groups (hereinafter referred to as "scrambling code groups") and detecting a scrambling code group. This operation reduces the number of scrambling codes as candidates in the third step and thereby increases the speed of the third step (the detection process of scrambling codes).

FIG. 1 is a diagram showing a conventional frame architecture to which the OFCDM system is applied. In the conventional OFCDM base cell search, as shown in FIG. 1, processing described below was carried out in order to perform the detection of scrambling code group simultaneously with the frame boundary detection in the second step. Specifically, in order to permit the detection of frame boundary, the base station sent additional SCHs (Synchronization Channels) 101, 102, 103 transmitted in the form of a special symbol sequence known to the mobile station, without multiplying the downlink channels by the scrambling codes, and the mobile station calculated the cross correlation between a received signal and the known SCH symbol sequence. ($C_{N-1} \ldots C_1$ identifying segments of the frame.) In order to permit the simultaneous detection of scrambling code group with the detection of frame boundary, a plurality of SCH symbol sequences were prepared and scrambling code groups were made correspondent to the respective SCH symbol sequences.

SUMMARY OF THE INVENTION

The above prior art, however, had the problem described below. Namely, there was a limit to transmission power which can be allocated to the downlink channels, in the mobile communication systems, and control channels (CCHs; Control Channels) and communication channels (TCHs; Traffic Channels) had to be sent within the limited range of transmission power. For this reason, the smaller the transmission power is allocated to CCHs, the larger the transmission power can be allocated to TCHs; it is thus feasible to increase the number of mobile stations that can be accommodated in the system, i.e., to increase the channel capacity.

In the conventional OFCDM base cell search, however, the additional SCHs were sent as described above, so that the channel capacity was reduced by the degree of the transmission power of the SCHs. Furthermore, the quality of TCHs degrades because of interference of SCHs with TCHs. It is conceivable to decrease the transmission power of SCHs, in order to avoid these drawbacks, but it decreases the probability of the detection of frame boundary and scrambling code group in the second step. As a result, the accuracy of the cell search is lowered.

In view of the above problem, an object of the present invention is to provide a mobile communication system, a channel synchronization establishing method, and a mobile station enabling a highly accurate cell search while decreasing the reduction of channel capacity and the interference with TCHs due to the transmission of SCHs.

In order to solve the above problem, a mobile communication system according to the present invention is a mobile communication system which comprises a base station and a mobile station and in which the base station transmits a pilot symbol sequence known to the mobile station, to the mobile station, using a plurality of carriers for downward channels, and performs communication with the mobile station while multiplying the channels by frequencywise same scrambling codes every symbol period, wherein the mobile station comprises boundary detecting means for calculating cross correlation allowing for a phase difference of the scrambling codes, between frequencywise pilot symbol sequences received from the base station, thereby detecting a radio frame boundary.

A channel synchronization establishing method according to the present invention is a channel synchronization establishing method in a mobile communication system which comprises a base station and a mobile station and in which the base station transmits a pilot symbol sequence known to the mobile station, to the mobile station, using a plurality of carriers for downward channels, and performs communication with the mobile station while multiplying the channels by frequencywise same scrambling codes every symbol period, the channel synchronization establishing method comprising: a boundary detecting step wherein the mobile station calculates cross correlation allowing for a phase difference of the scrambling codes, between frequencywise pilot symbol sequences received from the base station, thereby detecting a radio frame boundary.

A mobile station according to the present invention is a mobile station which receives a pilot symbol sequence known to the mobile station, from a base station, using a plurality of carriers for downward channels from the base station to the mobile station, and which performs communication with the base station, using the channels multiplied by frequencywise same scrambling codes every symbol period, the mobile station comprises: boundary detecting means for calculating cross correlation allowing for a phase difference of the scrambling codes, between frequencywise pilot symbol sequences received from the base station, thereby detecting a radio frame boundary.

According to these aspects of the invention, the mobile station calculates the cross correlation allowing for the phase difference of the scrambling codes, between frequencywise pilot symbol sequences (symbol sequences of pilot channels (PLCHs)) received from the base station, thereby detecting the radio frame boundary. This permits the detection of frame boundaries from PLCHs time-division-multiplexed with TCHs, without using the SCHs, which were indispensable in the conventional cell search. Therefore, the transmission power of the base station used to be allocated to the SCHs can be allocated to PLCHs or TCHs.

Particularly, the PLCHs generally necessitate the transmission power larger than the SCHs, because they are applied in various uses including channel estimation on the occasion of receiving TCHs. Since the transmission power larger than before can be allocated to such PLCHs, it is feasible to raise the probability of the detection of frame boundary and scrambling code group. As a consequence, it is feasible to provide the mobile communication system, the mobile station, and the channel synchronization establishing method enabling the highly accurate cell search while decreasing the reduction of channel capacity and the interference with TCHs due to the transmission of SCHs.

Preferably, the mobile communication system according to the present invention is configured so that the base station comprises: control information transmitting means for sending a plurality of pilot symbol sequences in one radio frame and for transmitting control information to the mobile station, using the phase difference of a plurality of scrambling codes by which the plurality of pilot symbol sequences are multiplied.

Preferably, the channel synchronization establishing method according to the present invention further comprises a control information transmitting step wherein the base station sends a plurality of pilot symbol sequences in one radio frame and transmits control information to the mobile station, using the phase difference of a plurality of scrambling codes by which the plurality of pilot symbol sequences are multiplied.

Namely, if there is disagreement as to the phase difference of scrambling codes (including a phase difference sequence) between the base station of a sender and the mobile station of a receiver, no correlation peak between symbols will be observed in timing of the pilot symbol sequences. Conversely, correlation peaks are observed only when there is agreement as to the phase difference between the sender and the receiver; therefore, the base station can transmit the control information to the mobile station, using the phase difference.

In the mobile communication system according to the present invention, more preferably, the control information is a scrambling code group used by the base station.

In the channel synchronization establishing method according to the present invention, more preferably, the control information is a scrambling code group used by the base station.

Namely, a plurality of phase differences are prepared on the occasion of transmitting the control information from the base station to the mobile station by use of the phase difference, and scrambling code groups are made correspondent to these phase differences. Then the mobile station performs the correlation detection using the phase differences corresponding to the scrambling code groups used in the base station, and selects a phase difference with which a correlation peak between symbols becomes maximum. By performing the detection of scrambling code group simultaneously with the detection of frame boundary in this way, it is feasible to decrease the number of candidates of scrambling codes as detection targets in the second step of the cell search. As a result, it is feasible to achieve the fast and accurate detection of scrambling codes in the third step.

In the mobile communication system according to the present invention, the phase difference, on a frequency interval basis, is a value falling within a scope of a coherent bandwidth.

In the channel synchronization establishing method according to the present invention, the phase difference, on a frequency interval basis, is a value falling within a scope of a coherent bandwidth.

According to these aspects of the invention, the phase difference of the scrambling codes by which the plurality of pilot symbol sequences are multiplied, on a frequency interval basis, is the value falling within the scope of the coherent bandwidth. This adequately decreases fluctuation of propagation paths within the range of carriers in the number equal to the phase difference. Accordingly, it is feasible to prevent degradation of correlation detection characteristics.

In the mobile communication system according to the present invention, the control information transmitting means transmits the control information, using plural types of pilot symbol sequences.

In the channel synchronization establishing method according to the present invention, the control information transmitting step is to transmit the control information, using plural types of pilot symbol sequences.

Namely, if there is disagreement as to the types of pilot symbol sequences between the base station of a signal sender and the mobile station of a receiver, no correlation peak between symbols will be observed in timing of pilot symbol sequences. Conversely, correlation peaks are observed only when there is agreement as to the types of pilot symbol sequences between the sender and the receiver; therefore, it becomes feasible to transmit the control information from the base station to the mobile station by use of the types of pilot symbol sequences.

In the mobile communication system according to the present invention, the pilot symbol sequences are pseudo-random sequences.

In the channel synchronization establishing method according to the present invention, the pilot symbol sequences are pseudo-random sequences.

Namely, if across correlation value between different pilot symbol sequences is large on the occasion of transmitting the control information by use of the plural types of pilot symbol sequences, the probability of erroneous reception of information will increase. According to these aspects of the invention, the pseudo-random sequences, which are sequences providing small cross correlation values, are used as the pilot symbol sequences, whereby the erroneous reception of information can be reduced.

In the mobile communication system according to the present invention, the control information is a scrambling code group used by the base station.

In the channel synchronization establishing method according to the present invention, the control information is a scrambling code group used by the base station.

Namely, plural types of pilot symbol sequences are prepared on the occasion of transmitting the control information from the base station to the mobile station by use of the pilot symbol sequences, and scrambling code groups are made correspondent to these types of pilot symbol sequences. Then the mobile station performs the correlation detection using the pilot symbol sequences corresponding to the scrambling code groups used in the base station, and selects a pilot symbol sequence with which a correlation peak between symbols becomes maximum. By detecting the scrambling code group simultaneously with the frame boundary in this way, it becomes feasible to decrease the number of candidates of scrambling codes as detection targets in the second step of the cell search. As a consequence, it is feasible to achieve the fast and accurate detection of scrambling codes in the third step.

Preferably, the mobile communication system according to the present invention is configured so that the boundary detecting means of the mobile station calculates the cross correlation between frequencywise pilot symbol sequences received from the base station and detects the radio frame boundary, using values resulting from normalization of cross correlation values by reception powers of the pilot symbol sequences.

Preferably, the channel synchronization establishing method according to the present invention is configured so that in the boundary detecting step the mobile station calculates the cross correlation between frequencywise pilot symbol sequences received from the base station and detects the radio frame boundary, using values resulting from normalization of cross correlation values by reception powers of the pilot symbol sequences.

Preferably, the mobile station according to the present invention is configured so that the boundary detecting means calculates the cross correlation between frequencywise pilot symbol sequences received from the base station and detects the radio frame boundary, using values resulting from normalization of cross correlation values by reception powers of the pilot symbol sequences.

According to these aspects of the invention, the peak detection is carried out using the cross correlation values normalized by the reception powers of the pilot symbol sequences, instead of directly using the cross correlation value at each time, whereby it becomes feasible to perform the correlation detection with higher accuracy and with less error.

More preferably, the mobile communication system according to the present invention is configured so that the boundary detecting means calculates the cross correlation between a pilot symbol sequence separated by FFT processing and a pilot symbol sequence resulting from multiplication by scrambling codes with a delay of a phase difference of one symbol period with respect to the pilot symbol sequence separated by FFT processing, thereby detecting the radio frame boundary.

More preferably, the channel synchronization establishing method according to the present invention is configured so that in the boundary detecting step the mobile station calculates the cross correlation between a pilot symbol sequence separated by FFT processing and a pilot symbol sequence resulting from multiplication by scrambling codes with a delay of a phase difference of one symbol period with respect to the pilot symbol sequence separated by FFT processing, thereby detecting the radio frame boundary.

More preferably, the mobile station according to the present invention is configured so that the boundary detecting means calculates the cross correlation between a pilot symbol sequence separated by FFT processing and a pilot symbol sequence resulting from multiplication by scrambling codes with a delay of a phase difference of one symbol period with respect to the pilot symbol sequence separated by FFT processing, thereby detecting the radio frame boundary.

According to these aspects of the invention, it becomes feasible to implement highly accurate detection of frame boundaries for frames in each of which pilot symbol sequences of two symbols are multiplexed in time division at the head and at the end, as well as frames in each of which a pilot symbol sequence of one symbol is multiplexed in time division.

Furthermore, the mobile communication system according to the present invention is configured so that the boundary detecting means calculates the cross correlation between a pilot symbol sequence separated by FFT processing and pilot symbol sequences resulting from multiplication by scrambling codes with delays of phase differences of a predetermined symbol period with respect to the pilot symbol sequence separated by FFT processing, thereby detecting the radio frame boundary, and so that the control information transmitting means transmits the scrambling code groups corresponding to the phase differences.

Furthermore, the channel synchronization establishing method according to the present invention is configured so that in the boundary detecting step the mobile station calculates the cross correlation between a pilot symbol sequence separated by FFT processing and pilot symbol sequences resulting from multiplication by scrambling codes with delays of phase differences of a predetermined symbol period with respect to the pilot symbol sequence separated by FFT processing, thereby detecting the radio frame boundary, and so that in the control information transmitting step the base station transmits the scrambling code groups corresponding to the phase differences.

Namely, a plurality of phase differences are prepared on the occasion of transmitting the control information from the base station to the mobile station by use of the phase differences, and the scrambling code groups are made correspondent to these phase differences. Then the mobile station performs the correlation detection using the phase differences corresponding to the scrambling code groups used in the base station, and selects a phase difference with which a correlation peak between symbols becomes maximum. By detecting the scrambling code group simultaneously with the frame boundary in this way, it becomes feasible to reduce the number of candidates of scrambling codes as detection targets in the second step of the cell search. As a consequence, it becomes feasible to achieve the fast and accurate detection of scrambling codes in the third step.

The present invention will become more fully understood from the detailed description given herein below and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

First Embodiment

Figure 1:
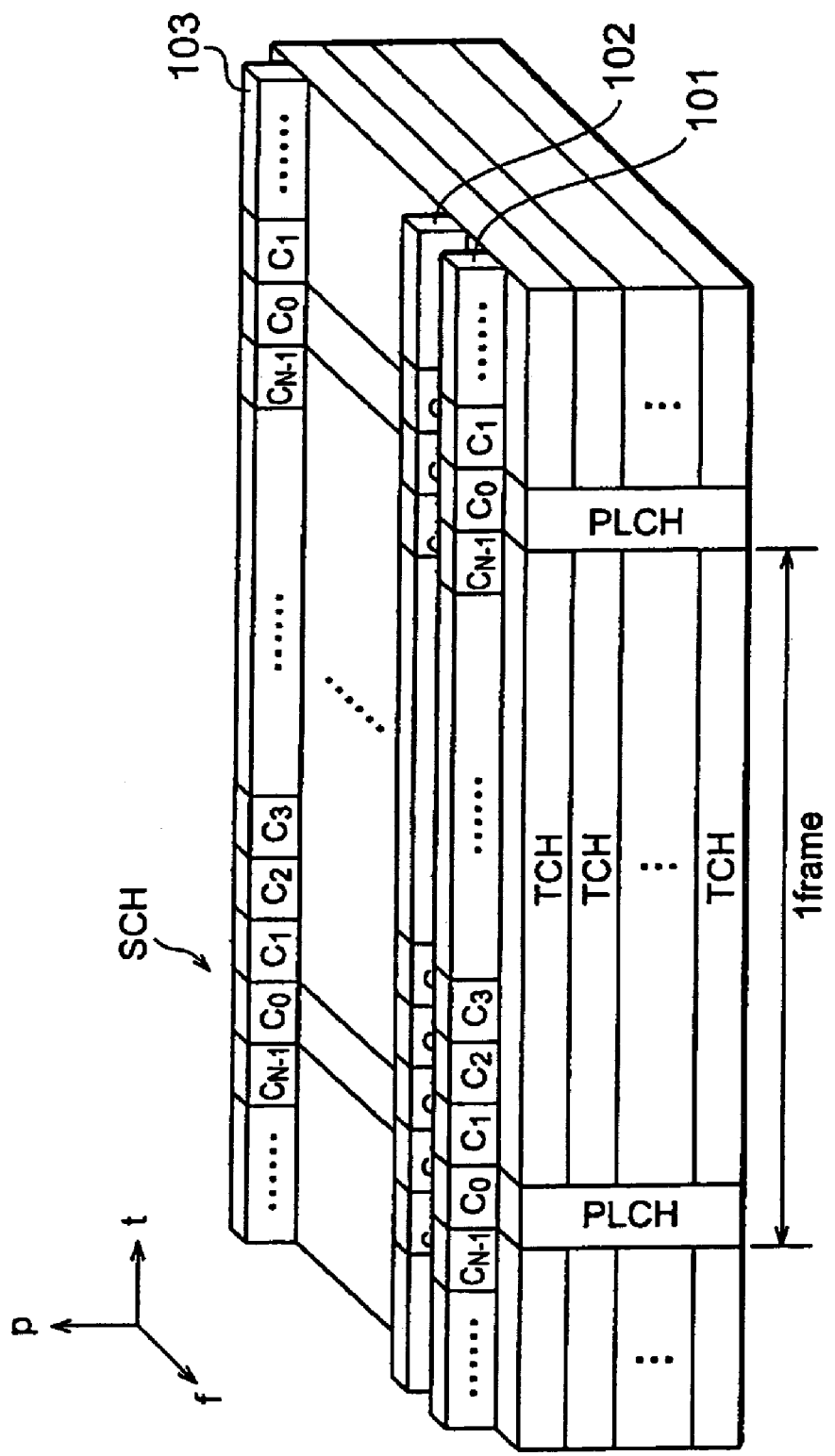
FIG. 1 is a diagram showing the frame architecture of the received signal transmitted and received through the use of the OFCDM system in the prior art.
Figure 2:
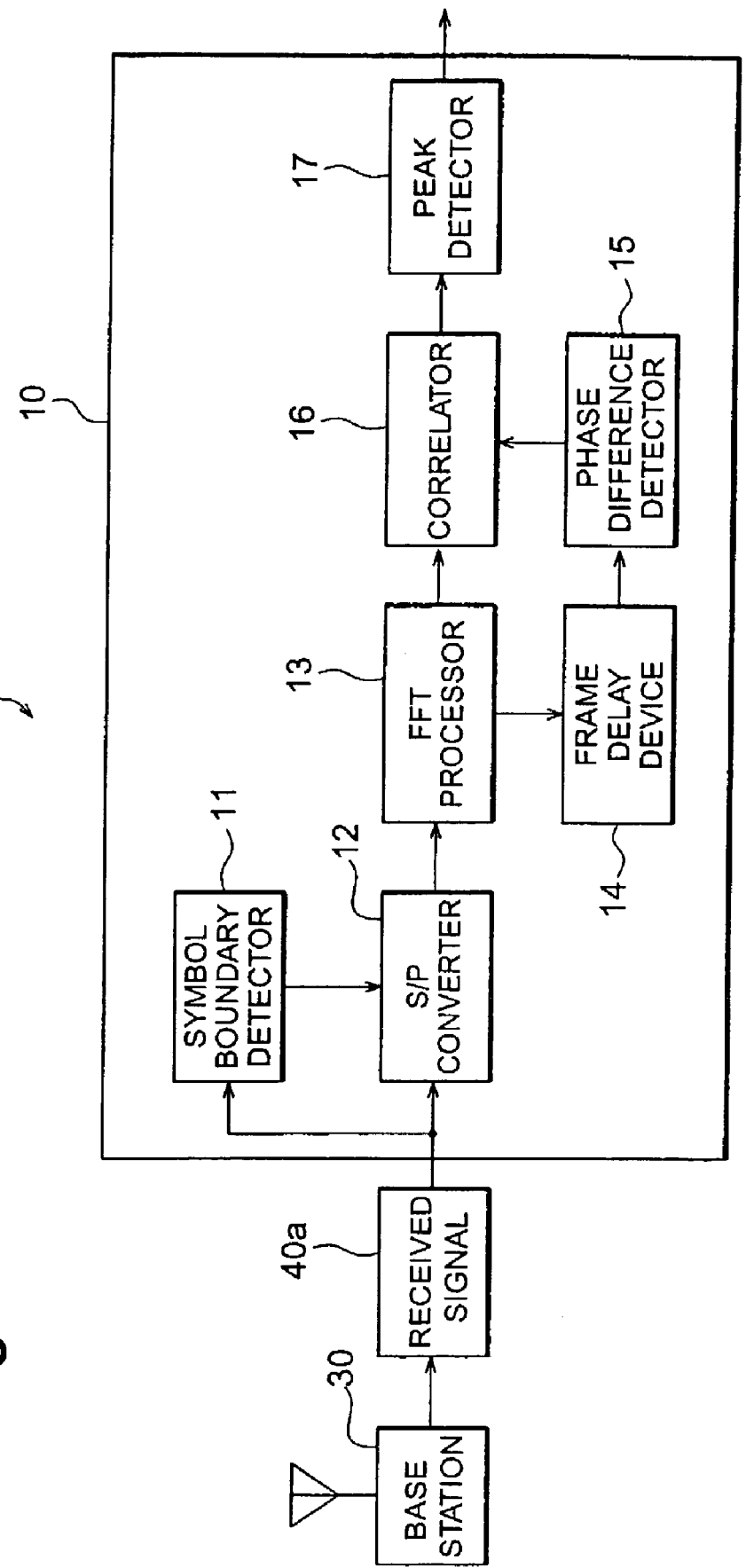
FIG. 2 is a block diagram showing the functional configuration of the mobile communication system in the first embodiment.

The first embodiment of the mobile communication system according to the present invention will be described below with reference to the accompanying drawings. FIG. 2 is a block diagram showing the functional configuration of the mobile communication system in the present embodiment. As shown in FIG. 2, the mobile communication system 1 is comprised of at least mobile station 10 and base station 30. The mobile communication system 1 is configured to implement transmission and reception of signals by use of the OFCDM (Orthogonal Frequency and Code Division Multiplex) system, which is a typical example of the frequency and code division multiplex systems using a plurality of carriers (carrier waves), between the mobile station 10 and the base station 30.

The mobile station 10 has the following configuration in order to carry out the detection process of frame boundary in the second step of the cell search. Namely, the mobile station 10 is provided with a symbol boundary detector 11, an S/P converter 12, an FFT (Fast Fourier Transform) processor 13, a frame delay device 14, a phase difference detector 15, a correlator 16, and a peak detector 17.

The symbol boundary detector 11 detects symbol boundaries of received signal 40a transmitted from the base station 30. The S/P converter 12 performs serial-to-parallel conversion of the received signal 40a after the detection of symbol boundaries by the symbol boundary detector 11. The FFT processor 13 acquires the received signal 40a after converted into parallel signals by the S/P converter 12 and separates each frame forming the received signal 40a, into symbol sequences.

The frame delay device 14 outputs frequencywise symbol sequences with a delay of one frame with respect to each frame separated into symbol sequences by the FFT processor 13, to the phase difference detector 15 described below. The phase difference detector 15 detects a phase difference of scrambling codes between a frame separated into symbol sequences by the FFT processor 13 and a frame delayed by one frame by the frame delay device 14.

The correlator 16 calculates a cross correlation value allowing for the phase difference detected by the phase difference detector 15, between the above separated frame and the frame delayed by one frame. The peak detector 17 (corresponding to the boundary detecting means) detects a frame boundary of the received signal 40a from a pilot symbol sequence at a time when a maximum (correlation peak) is observed, with reference to the cross correlation values calculated by the correlator 16.

Figure 3:
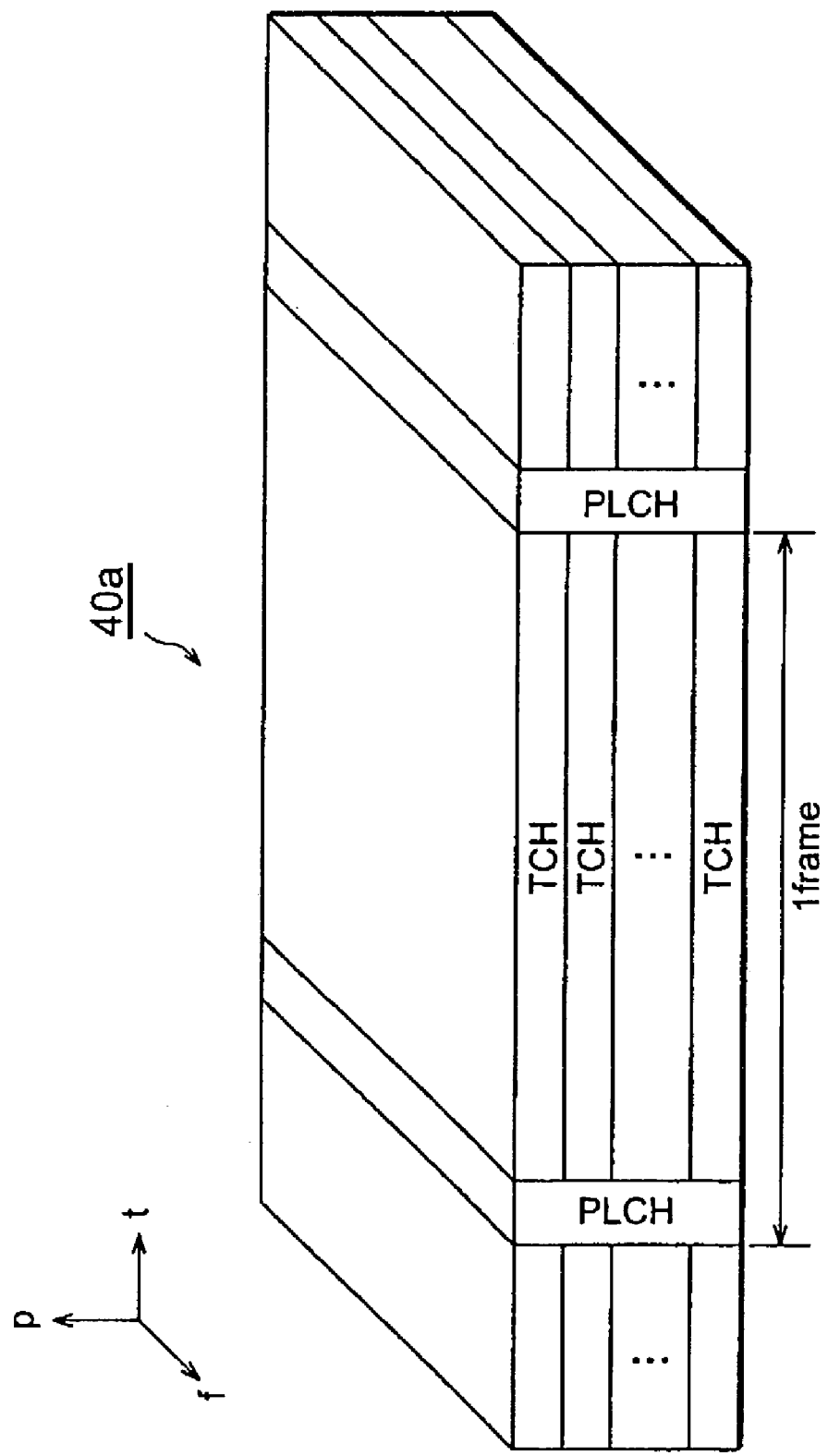
FIG. 3 is a diagram showing the frame architecture of the received signal transmitted and received through the use of the OFCDM system in the present invention.

FIG. 3 is a diagram showing the frame architecture of the received signal 40a transmitted and received using the OFCDM system. In FIG. 3, the time is defined along the t-axis direction, the frequency along the f-axis direction, (frequencywise) and the transmission power along the p-axis direction. As shown in FIG. 3, the received signal 40a consists of TCHs (Traffic Channels) and PLCHs (Pilot Channels) multiplexed in time division. The received signal 40a does not include any SCH (Synchronization Channel) as a constituent, different from the frame architecture described in Prior Art.

Figure 4:
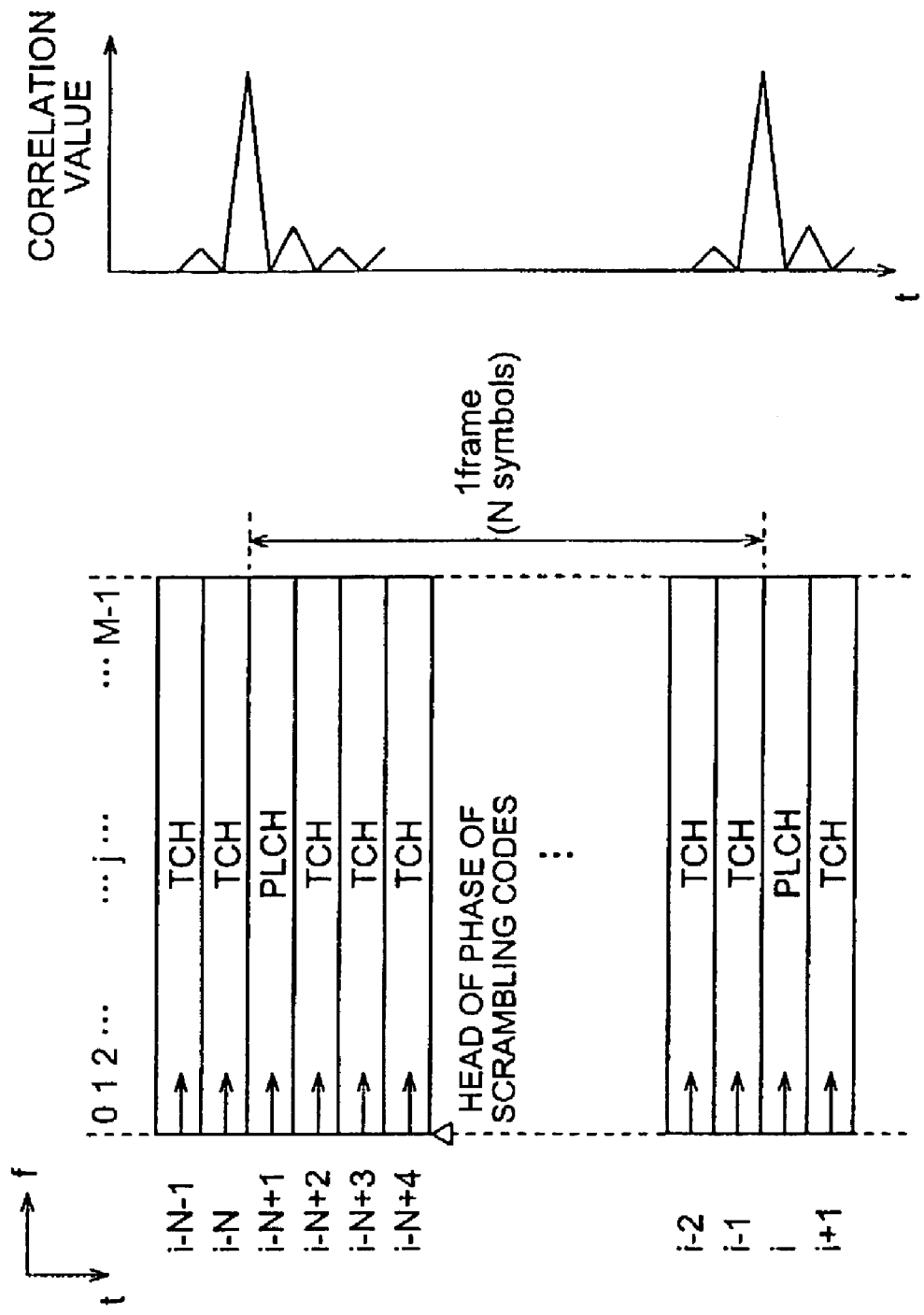
FIG. 4 is a diagram showing a phase state of scrambling codes by which each frame is multiplied, and an output example of cross correlation values between pilot symbol sequences in the first embodiment.

The procedure for the mobile station 10 to detect a frame boundary of the received signal 40a will be described below with reference to FIG. 4. FIG. 4 is a diagram showing a phase state of the scrambling codes by which the frames having the architecture shown in FIG. 3 are multiplied, and an output example of cross correlation values between pilot symbol sequences.

As shown in FIG. 4, one frame consists of M carriers having N symbols per unit. Namely, one frame consists of N×M symbols. In the present embodiment, a PLCH of one symbol is placed in each carrier at the head of each frame (e.g., t(i-N+1)). Each frequencywise symbol sequence is multiplied by a scrambling code sequence $[c]=[c_0, c_1, c_2, \ldots, c_{(M-1)}]$ in the same frequency direction as that of the symbol sequence. It is assumed in the present embodiment that the phase of the scrambling codes is equal in every period of each symbol sequence.

Under the above circumstances, a frequencywise received symbol $r_{ij}$ at time i and in the jth carrier is expressed by Eq (1) below.

$$r_{ij} = f_{ij} s_{ij} c_j \tag{1}$$

In the above equation, $s_{ij}$ denotes a frequencywise transmitted symbol at time i and in the jth carrier, and $f_{ij}$ a propagation path vector at time i and in the jth carrier. The background noise component will be ignored.

The mobile station 10 detects the symbol boundaries through the use of guard intervals or the like in the first step of the cell search, and thereafter calculates the cross correlation between a received symbol sequence $[r_{ij}]=[r_{i0}, r_{i1}, r_{i2}, \ldots, r_{i(M-1)}]$ at each time i and a received symbol sequence $\{r_{(i-N)j}\}=\{r_{(i-N)0}, r_{(i-N)1}, r_{(i-N)2}, \ldots, r_{(i-N)(M-1)}\}$ one frame preceding to the frame including the received symbol sequence at each time i. The cross correlation value $y_i$ at time i is represented by Eq (2) below.

$$y_i = \sum_{j=0}^{M-1} r_{ij} r^*_{(i-N)j} \tag{2}$$

$$= \sum_{j=0}^{M-1} f_{ij} f^*_{(i-N)j} s_{ij} s^*_{(i-N)j} c_j c^*_j$$

When the temporal fluctuation of propagation paths can be assumed to be sufficiently slow relative to one frame time (a period of N symbols), the following relation holds: $f_{ij}f^*_{(i-N)j}=|f_{ij}|^2$. Since $c_j c^*_j = 1$, Eq (2) can be rewritten as Eq (3) below.

$$y_i = \sum_{j=0}^{M-1} |f_{ij}|^2 s_{ij} s^*_{(i-N)j} \qquad (3)$$

Since signals transmitted by TCHs are those subjected to information modulation and a plurality of channels are multiplexed, there is no correlation between a transmitted symbol sequence $\{s_{ij}\}=\{s_{i0}, s_{i1}, s_{i2}, \ldots, s_{i(M-1)}\}$ at time i and a transmitted symbol sequence $\{s_{(i-N)j}\}=\{s_{(i-N)0}, s_{(i-N)1}, s_{(i-N)2}, \ldots, s_{(i-N)(M-1)}\}$ one frame preceding to the frame including the transmitted symbol sequence at time i, and thus $y_i$ must take a sufficiently small value. In contrast to it, since the same symbol sequence is transmitted in PLCH in each frame, $s_{ij} s^*_{(i-N)j} = 1$ in the case of PLCH. Accordingly, we obtain the following equation.

$$y_i = \sum_{j=0}^{M-1} |f_{ij}|^2$$

Namely, the real part of $y_i$ takes a maximum (correlation peak) at the time of each PLCH (t(i-N+1) in FIG. 4), and thus a frame boundary can be detected by determining the time i when the real part of $y_i$ becomes maximum.

In the mobile communication system 1 of the first embodiment, as described above, the mobile station 10 detects the radio frame boundary by calculating the cross correlation allowing for the phase difference of the frequencywise same scrambling codes, between the frequencywise pilot symbol sequences (symbol sequences of PLCHs) received from the base station 30. This permits the detection of frame boundary from the PLCHs multiplexed in time division with TCHs, without using the SCHs indispensable in the conventional cell search. Accordingly, the transmission power of the base station used to be allocated to the SCHs can be allocated to the PLCHs or TCHs.

Particularly, the PLCHs generally necessitate the larger transmission power than the SCHs, because they are applied in various uses including the channel estimation on the occasion of receiving the TCHs. Since the larger transmission power than before can be allocated to such PLCHs, it is feasible to raise the probability of the detection of frame boundary and the probability of the detection of scrambling code group. As a consequence, it is feasible to provide the mobile communication system, channel synchronization establishing method, and mobile station enabling the highly accurate cell search while decreasing the reduction of channel capacity and the interference with TCHs due to the transmission of SCHS.

Second Embodiment

Figure 5:
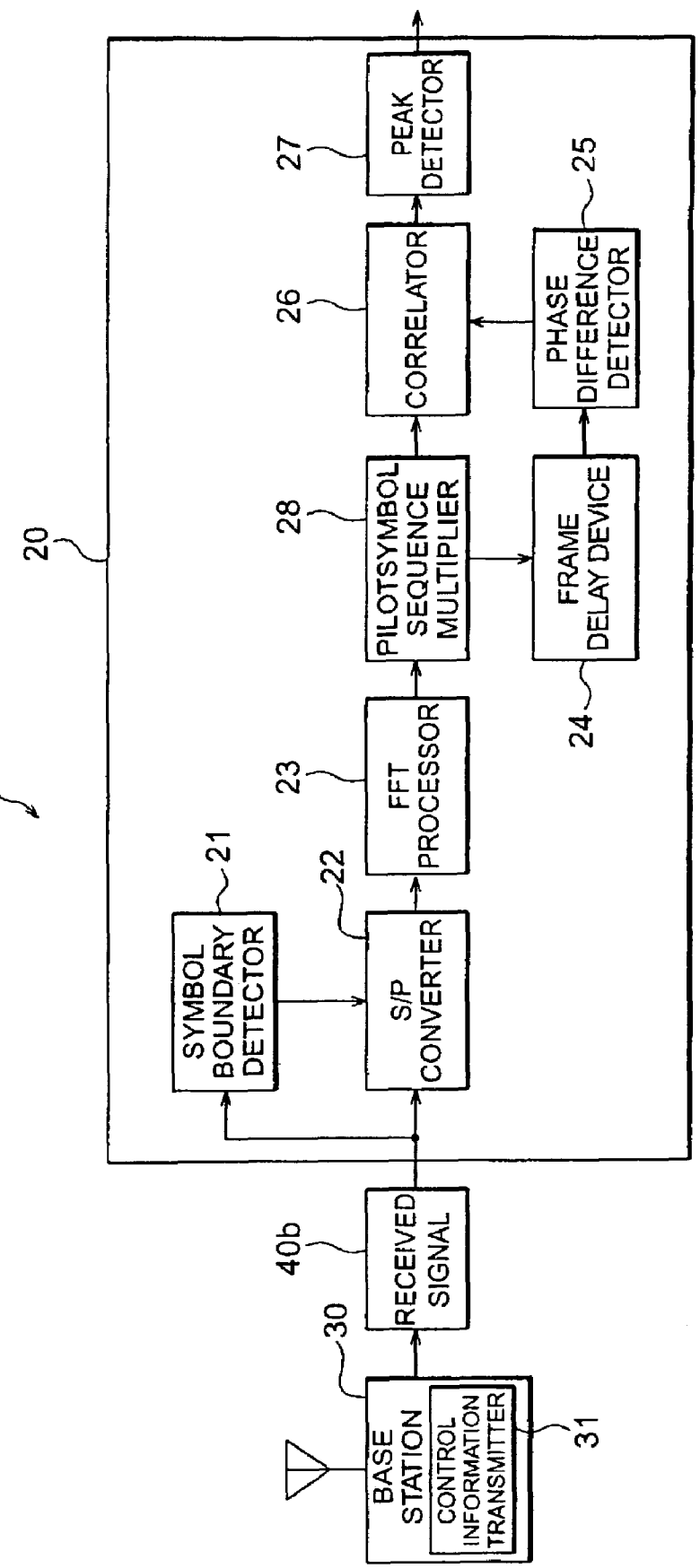
FIG. 5 is a block diagram showing the functional configuration of the mobile communication system in the second embodiment.

The following will describe the mobile communication system in the second embodiment, which is a modification of the first embodiment. FIG. 5 is a block diagram showing the functional configuration of the mobile communication system in the present embodiment. As shown in FIG. 5, the mobile communication system 2 is comprised of at least mobile station 20 and base station 30. The mobile communication system 2 is configured to perform transmission and reception of signals by use of the OFCDM system between the mobile station 20 and the base station 30. The mobile communication system 2 is different from the mobile communication system 1 in the first embodiment in that it is configured on the assumption that PLCHs are multiplexed in time division one symbol each at the head and at the end in each frame, i.e., a total of two symbols are multiplexed in time division in each frame.

The mobile station 20 has the following configuration in order to carry out the detection process of frame boundary in the second step of the cell search. As shown in FIG. 5, the mobile station 20 is provided with a symbol boundary detector 21, an S/P converter 22, an FFT processor 23, a pilot symbol sequence multiplier 28, a frame delay device 24, a phase difference detector 25, a correlator 26, and a peak detector 27.

The symbol boundary detector 21 detects the symbol boundaries of received signal 40b transmitted from the base station 30. The S/P converter 22 performs serial-to-parallel conversion of the received signal 40b after the detection of symbol boundaries by the symbol boundary detector 21. The FFT processor 23 acquires the received signal 40b after converted into parallel signals by the S/P converter 22 and separates each frame forming the received signal 40b, into symbol sequences. The pilot symbol sequence multiplier 28 multiplies each symbol sequence separated by the FFT processor 23, by a complex conjugate of the pilot symbol sequence and outputs each received symbol sequence to the frame delay device 24 and to the correlator 26.

The frame delay device 24 outputs a received symbol sequence with a delay of one symbol period with respect to the received symbol sequence outputted from the pilot symbol sequence multiplier 28, to the phase difference detector 25 described below. The phase difference detector 25 detects the phase difference of the scrambling codes between the received symbol sequence outputted from the pilot symbol sequence multiplier 28 and the received symbol sequence delayed by one symbol period by the frame delay device 24.

The correlator 26 calculates the cross correlation value allowing for the phase difference detected by the phase difference detector 25, between the above received symbol sequence thus outputted, and the received symbol sequence with the delay of one symbol period. The peak detector 27 (corresponding to the boundary detecting means) detects a frame boundary of the received signal 40b from the pilot symbol sequence at the time when a maximum (correlation peak) is observed, with reference to the cross correlation values calculated by the correlator 26.

The base station 30 is provided with a control information transmitter 31. The control information transmitter 31 (corresponding to the control information transmitting means) transmits the received signal 40b to the mobile station 20. More particularly, the control information transmitter 31 sends a plurality of pilot symbol sequences in one frame, using the received signal 40b, and transmits the control information to the mobile station 20, using the phase difference of a plurality of scrambling codes by which the plurality of pilot symbol sequences are multiplied.

Figure 6:
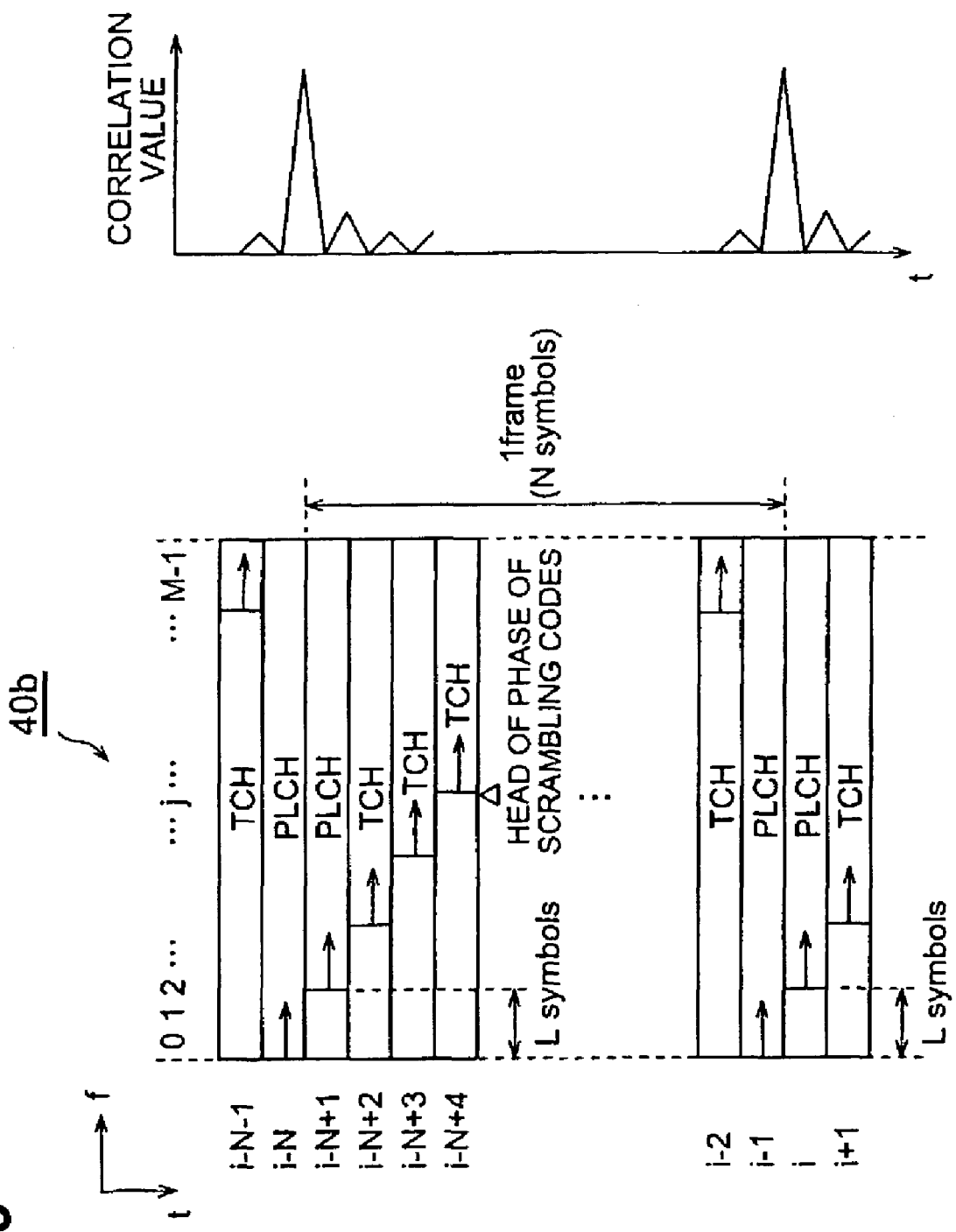
FIG. 6 is a diagram showing a phase state of scrambling codes by which each frame is multiplied, and an output example of cross correlation values between pilot symbol sequences in the second embodiment.

The procedure for the mobile station 20 to detect a frame boundary of the received signal 40b will be described below with reference to FIG. 6. FIG. 6 is a diagram showing a phase state of scrambling codes by which each frame is multiplied, and an output example of cross correlation values between pilot symbol sequences.

As shown in FIG. 6, one frame consists of M carriers each including N symbols per unit. Namely, one frame consists of N×M symbols. In the present embodiment, PLCHs are arranged one symbol each at the head of each frame (e.g., t(i-N+1)) and at the end of each frame (e.g., t(i-1)) in every carrier. Each frequencywise symbol sequence is multiplied by scrambling codes $$\{c'\} (c'_{j+kM} = c_j \ (k = 0, \pm 1, \pm 2, \ldots ))$$

in the same frequency direction as that of the symbol sequence, and with the phase differing every symbol period. It is assumed in the present embodiment that the phase difference of the scrambling code sequences is L symbols between each set of adjacent symbol sequences, for convenience' sake of explanation.

Under the above conditions, a received symbol $$r'_{ij}$$

at time i and in the jth carrier is expressed by Eq (4) below.

$$r'_{ij} = f_{ij} s_{ij} c'_{(j-iL)} \quad (4)$$

The mobile station 30 detects the symbol boundaries through the use of guard intervals or the like in the first step of the cell search and thereafter first multiplies the received symbol sequence at each time i by the complex conjugate of the pilot symbol sequence $$\{p^*\} = \{p_0^*, p_1^*, p_2^*, \ldots, p_{(M-1)}^*\}.$$

Supposing the result is $\{x_{ij}\} = \{x_{i0}, x_{i1}, x_{i2}, \ldots x_{i(M-1)}\}$, $x_{ij}$ is represented by Eq (5) below.

$$x_{ij} = r'_{ij} p_j^* \quad (5)$$
$$= f_{ij} s_{ij} c'_{(j-iL)} p_j^*$$

Then the mobile station calculates the cross correlation between each symbol sequence $\{x_{ij}\}$ and a symbol sequence obtained by shifting the symbol sequence $\{x_{(i-1)j}\}$ one symbol period preceding thereto, by L symbols. The cross correlation value $y'_i$ at this time is represented by Eq (6) below.

$$y'_i = \sum_{j=0}^{M-1} x_{ij} x^*_{(i-1)(j-L)} \quad (6)$$
$$= \sum_{j=0}^{M-1} f_{ij} f^*_{(i-1)(j-L)} s_{ij} s^*_{(i-1)(j-L)} c'_{(j-iL)} c'^*_{(j-iL)} p_j^* p_{(j-L)}$$

When it can be assumed herein that the temporal fluctuation of propagation paths is sufficiently slow relative to one symbol period and that the fluctuation of propagation paths is sufficiently small in the range of L carriers, the following relation holds:

$$f_{ij} f^*_{(i-1)(j+L)} = |f_{ij}|^2. \text{ Since } c'_j c'^*_j = 1,$$

Eq (6) can be rewritten as Eq (7) below.

$$y'_i = \sum_{j=0}^{M-1} |f_{ij}|^2 s_{ij} s^*_{(i-1)(j-L)} p_j^* p_{(j-L)} \quad (7)$$

Since the signals transmitted by TCHs are those subjected to information modulation and a plurality of channels are multiplexed, there is no correlation between $\{s_i\}$ and $\{p\}$, and $y'_i$ must take a small value (a value close to 0). In contrast to it, supposing the same sequence is transmitted in each symbol period of PLCH, $s_{ij} p^*_j = 1$ in the case of PLCHs. Accordingly, we obtain the following equation.

$$y'_i = \sum_{j=0}^{M-1} |f_{ij}|^2$$

Namely, since the real part of $y'_i$ takes a maximum correlation peak value in the timing of PLCHs (t(i-N+1) and t(i-1) in FIG. 6), the frame boundary can be detected by determining the time i where the real part of $y'_i$ becomes maximum.

The phase difference L should be determined, as described above, on the assumption that the fluctuation of propagation paths is sufficiently small in the range of L carriers. The reason is that large fluctuation of propagation paths will degrade the correlation detection characteristics. In order to avoid it, the phase difference L should be so set that the phase difference L on a frequency interval basis falls within a scope smaller than the coherent bandwidth (1/σ [Hz] where σ [s] is a delay spread of propagation paths).

Referring to Eq (7), the correlation peaks will not be observed in the timing of PLCHs unless there is agreement as to the phase difference L (including the phase difference sequence) between the base station 30 of a sender and the mobile station 20 of a receiver. Conversely, correlation peaks are observed only when there is agreement as to the phase difference L between the sender and the receiver; it is therefore feasible to transmit the control information from the base station 30 to the mobile station 20 by use of the phase difference L.

For example, a plurality of phase differences are prepared on the occasion of transmitting the control information from the base station 30 to the mobile station 20 by use of the phase differences, and scrambling code groups are made correspondent to the respective phase differences. Then the mobile station 20 performs the correlation detection using the phase differences corresponding to the scrambling code groups used in the base station 30, and selects a phase difference L with which the correlation peak becomes maximum. The mobile station detects the frame boundary and the scrambling code group simultaneously in this way. This operation makes it feasible to reduce the number of candidates of scrambling codes as detection targets in the second step of the cell search. As a consequence, it is feasible to achieve the fast and accurate detection of scrambling codes in the third step.

Furthermore, in the case where PLCHs exist over three or more symbol periods in one frame, as in the case of code division multiplexing of PLCHs and TCHs, the phase differences of scrambling codes between PLCHs can be provided as a sequence. In this case, the control information can be put on the phase difference sequence and it is thus possible to increase the amount of information that can be transmitted.

As apparent from Eq (7), the correlation peaks will not be observed in the timing of PLCHs unless there is agreement as to the type of the pilot symbol sequences {p} between the base station 30 of a sender and the mobile station 20 of a receiver. By preparing plural types of pilot symbol sequences, therefore, it becomes feasible to transmit the control information of scrambling code groups or the like used in the base station 30, from the base station 30 to the mobile station 20, using them. In this case, if the cross correlation value is large between different pilot symbol sequences, the probability of erroneous reception of information will increase. For this reason, it is preferable to use sequences providing cross correlation values as small as possible, for example, pseudo-random sequences as the pilot symbol sequences.

The cross correlation values obtained at the times other than those of the frame boundaries are dependent upon the power of the received symbol sequence; the larger the power of the received symbol sequence, the larger the cross correlation value becomes. For this reason, in the case of the frame architecture shown in FIG. 3, if the power of TCHs is greater than that of PLCHs, relatively large cross correlation values will also be calculated at the times other than those of the frame boundaries and the probability of correct detection of correlation peak will be lowered. Therefore, the mobile station 20 performs the peak detection using values resulting from normalization of the cross correlation values by reception powers of the received symbol sequences, instead of directly using the cross correlation value at each time. This enables the correlation detection with higher accuracy and with less error.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A mobile communication system, comprising:
a base station and a mobile station and in which the base station transmits a pilot symbol sequence known to the mobile station, to the mobile station, using a plurality of carriers for downward channels, and performs communication with the mobile station while multiplying the channels by frequencywise same scrambling codes every symbol period, frequencywise defined as being along a frequency axis,
wherein the mobile station includes boundary detecting means for calculating cross correlation allowing for a phase difference of the scrambling codes, between frequencywise pilot symbol sequences received from the base station, thereby detecting a radio frame boundary, and said phase difference, on a frequency interval basis, is value falling within a scope of a coherent bandwidth.

2. The mobile communication system according to claim 1, wherein the base station comprises:
control information transmitting means for sending a plurality of pilot symbol sequences in one radio frame and for transmitting control information to the mobile station, using the phase difference of a plurality of scrambling codes by which the plurality of pilot symbol sequences are multiplied.

3. The mobile communication system according to claim 2, wherein said control information is a scrambling code group used by the base station.

4. The mobile communication system according to claim 3, wherein said boundary detecting means calculates the cross correlation between a pilot symbol sequence separated by FFT processing and pilot symbol sequences resulting from multiplication by scrambling codes with delays of phase differences of a predetermined symbol period with respect to the pilot symbol sequence separated by FFT processing, thereby detecting the radio frame boundary, and
wherein said control information transmitting means transmits scrambling code groups corresponding to said phase differences.

5. The mobile communication system according to claim 2, wherein said control information transmitting means transmits the control information, using plural types of pilot symbol sequences.

6. The mobile communication system according to claim 5, wherein said pilot symbol sequences are pseudo-random sequences.

7. The mobile communication system according to claim 5, wherein said control information is a scrambling code group used by the base station.

8. The mobile communication system according to claim 1, wherein the boundary detecting means of the mobile station calculates the cross correlation between frequencywise pilot symbol sequences received from the base station and detects the radio frame boundary, using values resulting from normalization of cross correlation values by reception powers of the pilot symbol sequences.

9. The mobile communication system according to claim 1, wherein said boundary detecting means calculates the cross correlation between a pilot symbol sequence separated by FFT processing and a pilot symbol sequence resulting from multiplication by scrambling codes with a delay of a phase difference of one symbol period with respect to the pilot symbol sequence separated by FFT processing, thereby detecting the radio frame boundary.

10. The mobile communication system according to claim 1,
wherein the base station performs communication with the mobile station while multiplying the channels by frequencywise and time's axiswise same scrambling codes every symbol period, and
the boundary detecting means of the mobile station calculates cross correlation allowing for a phase difference of the scrambling codes, between frequencywise and time's axiswise pilot symbol sequences received from the base station, thereby detecting a radio frame boundary.

11. A channel synchronization establishing method in a mobile communication system which comprises a base station and a mobile station and in which the base station transmits a pilot symbol sequence known to the mobile station, to the mobile station, using a plurality of carriers for downward channels, and performs communication with the mobile station while multiplying the channels by frequencywise same scrambling codes every symbol period, frequencywise defined as along a frequency axis said channel synchronization establishing method comprising:
detecting a boundary wherein the mobile station calculates cross correlation allowing for a phase difference of the scrambling codes, between frequencywise pilot symbol sequences received from the base station, thereby detecting a radio frame boundary, said phase difference, on a frequency interval basis, being a value falling within a scope of a coherent bandwidth.

12. The channel synchronization establishing method according to claim 11, further comprising a control information transmitting step wherein the base station sends a plurality of pilot symbol sequences in one radio frame and transmits control information to the mobile station, using the phase difference of a plurality of scrambling codes by which the plurality of pilot symbol sequences are multiplied.

13. The channel synchronization establishing method according to claim 12, wherein said control information is a scrambling code group used by the base station.

14. The channel synchronization establishing method according to claim 13, wherein in said boundary detecting step the mobile station calculates the cross correlation between a pilot symbol sequence separated by FFT processing and pilot symbol sequences resulting from multiplication by scrambling codes with delays of phase differences of a predetermined symbol period with respect to the pilot symbol sequence separated by FFT processing, thereby detecting the radio frame boundary, and wherein in said control information transmitting step the base station transmits scrambling code groups corresponding to said phase differences.

15. The channel synchronization establishing method according to claim 12, wherein said control information transmitting step is to transmit the control information, using plural types of pilot symbol sequences.

16. The channel synchronization establishing method according to claim 15, wherein said pilot symbol sequences are pseudo-random sequences.

17. The channel synchronization establishing method according to claim 15, wherein said control information is a scrambling code group used by the base station.

18. The channel synchronization establishing method according to claim 11, wherein in said boundary detecting step the mobile station calculates the cross correlation between frequencywise pilot symbol sequences received from the base station and detects the radio frame boundary, using values resulting from normalization of cross correlation values by reception powers of the pilot symbol sequences.

19. The channel synchronization establishing method according to claim 11, wherein in said boundary detecting step the mobile station calculates the cross correlation between a pilot symbol sequence separated by FFT processing and a pilot symbol sequence resulting from multiplication by scrambling codes with a delay of a phase difference of one symbol period with respect to the pilot symbol sequence separated by FFT processing, thereby detecting the radio frame boundary.

20. The channel synchronization establishing method according to claim 11, wherein the base station performs communication with the mobile station while multiplying the channels by frequencywise and time's axiswise same scrambling codes every symbol period, and in the boundary detecting step, the mobile station calculates cross correlation allowing for a phase difference of the scrambling codes, between frequencywise and time's axiswise pilot symbol sequences received from the base station, thereby detecting a radio frame boundary.

21. A mobile station which receives a pilot symbol sequence known to the mobile station, from a base station, using a plurality of carriers for downward channels from the base station to the mobile station, and which performs communication with the base station, using the channels multiplied by frequencywise same scrambling codes every symbol period, frequencywise defined as along a frequency axis said mobile station comprises:

boundary detecting means for calculating cross correlation allowing for a phase difference of the scrambling codes, between frequencywise pilot symbol sequences received from the base station, thereby detecting a radio frame boundary, said phase difference, on a frequency interval basis, being a value falling within a scope of a coherent bandwidth.

22. The mobile station according to claim 21, wherein said boundary detecting means calculates the cross correlation between frequencywise pilot symbol sequences received from the base station and detects the radio frame boundary, using values resulting from normalization of cross correlation values by reception powers of the pilot symbol sequences.

23. The mobile station according to claim 21, wherein said boundary detecting means calculates the cross correlation between a pilot symbol sequence separated by FFT processing and a pilot symbol sequence resulting from multiplication by scrambling codes with a delay of a phase difference of one symbol period with respect to the pilot symbol sequence separated by FFT processing, thereby detecting the radio frame boundary.

24. The mobile station according to claim 21, wherein the mobile station performs communication with the base station, using the channels multiplied by frequencywise and time's axiswise same scrambling codes every symbol period, and the boundary detecting means calculates cross correlation allowing for a phase difference of the scrambling codes, between frequencywise and time's axiswise pilot symbol sequences received from the base station, thereby detecting a radio frame boundary.

\* \* \* \* \*